(12) United States Patent
Duronio (10) Patent No.: US 11,138,577 B2
(45) Date of Patent: Oct. 5, 2021

(54) SYSTEM, METHOD, AND COMPUTER PROGRAM PRODUCT FOR AUTOMATICALLY MANAGING PERIODIC DEBT PAYMENTS AND SAVINGS CONTRIBUTIONS

(71) Applicant: American International Group, Inc., New York, NY (US)

(72) Inventor: Joseph F. Duronio, Culver City, CA (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 510 days.

(21) Appl. No.: 15/707,748

(22) Filed: Sep. 18, 2017

(65) Prior Publication Data
US 2018/0082269 A1    Mar. 22, 2018

Related U.S. Application Data

(60) Provisional application No. 62/396,653, filed on Sep. 19, 2016.

(51) Int. Cl.
*G06Q 30/00* (2012.01)
*G06Q 20/10* (2012.01)
(Continued)

(52) U.S. Cl.
CPC .......... *G06Q 20/102* (2013.01); *G06Q 20/42* (2013.01); *G06Q 30/04* (2013.01); *G06Q 50/188* (2013.01)

(58) Field of Classification Search
CPC ...... G06Q 20/102; G06Q 20/42; G06Q 30/04; G06Q 50/188
(Continued)

(56) References Cited

U.S. PATENT DOCUMENTS 5,689,649 A   11/1997   Altman et al.
6,070,153 A    5/2000   Simpson
(Continued)

OTHER PUBLICATIONS

Zimmerman, Kaytie "Which Employers Are Helping Millennials Repay Their Student Loans?," Forbes, Aug. 23, 2016. https://www.forbes.com/sites/kaytiezimmerman/2016/08/23/which-employers-are-helping-millennials-repay-student-loans/#2498e10f3385 (Year: 2016).*

(Continued)

*Primary Examiner* — John H. Holly
(74) *Attorney, Agent, or Firm* — Snell & Wilmer L.L.P.

(57) ABSTRACT

Systems, methods, and computer program products for automatically managing periodic debt payments and savings contributions are constructed to determine an allocation structure for each periodic payment between a debt obligation and a savings fund via a non-transitory computer-readable medium including a payment management program, a benefit management processor, and a data storage device in operable arrangement therewith. The payment management program includes a payment allocation module having a computer executable allocation code segment configured to apportion the payment election into a debt portion and a savings portion and a fund disbursement module having a computer executable disbursement code segment configured to electronically disburse the debt portion of the payment election to the lender in a periodic manner according to a loan repayment schedule and to electronically disburse the savings portion to the savings account of the lendee in a periodic manner according to a savings contribution schedule.

8 Claims, 4 Drawing Sheets

(51) Int. Cl.
 G06Q 30/04 (2012.01)
 G06Q 20/42 (2012.01)
 G06Q 50/18 (2012.01)
(58) Field of Classification Search
 USPC ....... 705/4, 40, 1.1, 38, 39, 36 R, 31, 14.17, 705/26.1
 See application file for complete search history.

(56) References Cited

U.S. PATENT DOCUMENTS

| | | | |
|---|---|---|---|
| 6,397,196 | B1 | 5/2002 | Kravetz et al. |
| 7,752,102 | B2 | 7/2010 | Thomas |
| 7,797,208 | B2 | 9/2010 | Thomas |
| 8,126,796 | B2 | 2/2012 | Blair |
| 8,200,554 | B1 * | 6/2012 | Foss .................. G06Q 20/108 705/30 |
| 8,332,311 | B2 | 12/2012 | Kim |
| 8,374,936 | B2 | 2/2013 | Fuentes-Torres |
| 8,392,327 | B2 | 3/2013 | Sheehy et al. |
| 8,589,287 | B2 | 11/2013 | Kim |
| 8,612,341 | B2 | 12/2013 | Sullivan |
| 8,682,760 | B2 | 3/2014 | Cameo et al. |
| 8,799,155 | B2 | 8/2014 | Sheehy et al. |
| 2003/0074311 | A1 | 4/2003 | Saylors et al. |
| 2003/0225649 | A1 | 12/2003 | Simpson |
| 2004/0044616 | A1 | 3/2004 | Salter |
| 2005/0065873 | A1 | 3/2005 | Hendrickson et al. |
| 2009/0150286 | A1 | 6/2009 | Barton |
| 2010/0094776 | A1 * | 4/2010 | Combs .................. G06Q 40/06 705/36 R |
| 2010/0228651 | A1 * | 9/2010 | Becerra .................. G06Q 30/04 705/34 |
| 2010/0325036 | A1 | 12/2010 | Thomas |
| 2015/0081411 | A1 | 3/2015 | Tucker et al. |

OTHER PUBLICATIONS

Simons, Victoria et al, "New Job Perk Could Save Grads 3 Years of Student Loan Payments," Nerdwallet, Mar. 2, 2016. https://www.nerdwallet.com/blog/loans/student-loans/employer-benefit-student-loans/ (Year: 2016).*

Ramsey, Dave, "Pay Off Debt Before You Save for Retirement," Mar. 11, 2016. https://web.archive.org/web/20160311195922/http://www.daveramsey.com:80/blog/pay-off-debt-before-retirement (Year: 2016).*

Zimmerman, Kaytie "Which Employers Are Helping Millennials Repay Their Student Loans?," Forbes, Aug. 23, 2016. https ://www.forbes.com/sites/kayti ezi mmerman/2016/08/23/whi ch-employers-are-hel ping-mi 11 en n ials-repay-student-l oans/#2498e1 0f3385 (Year: 2016).*

ProQuestDialogNPL Search History.*

United States: Prudential Retirement to Offer Student Loan Genius 401(K) Feature to Clients (Mar. 29, 2016) 3 pages.

Student Loan Genius Rolls out 401(k) Contribution Student Loan Benefit, Making Student Load Payments a Wealth-Building Activity (Mar. 2, 2016) 4 pages.

National Education Survey Indicates That an Employer Student Loan Repayment Benefit is Attractive to Employees (Mar. 22, 2016) 3 pages.

* cited by examiner

SYSTEM, METHOD, AND COMPUTER PROGRAM PRODUCT FOR AUTOMATICALLY MANAGING PERIODIC DEBT PAYMENTS AND SAVINGS CONTRIBUTIONS

CROSS-REFERENCE TO RELATED APPLICATIONS

This patent application claims the benefit of priority to U.S. Patent Application No. 62/396,653, filed Sep. 19, 2016, and entitled "System, Method, and Computer Program Product for Automatically Managing Periodic Debt Payments and Savings Contributions," which application is incorporated in its entirety herein by this reference.

TECHNICAL FIELD

This patent disclosure relates, generally, to systems, methods, and computer program products for automatically managing periodic debt payments and savings contributions and, more particularly, to systems, methods, and computer program products for determining an allocation structure for a periodic payment between a debt obligation and a savings fund.

BACKGROUND

In the United States, student loan debt is becoming an increasingly higher percentage of the average total household non-mortgage debt, and has surpassed the aggregate household credit card debt and auto loan debt. The increasing student loan debt burden is likely to negatively impact the ability of future generations of Americans to save for retirement. Moreover, because the vast majority of these loans are backed by the United States government, they represent a huge potential liability for taxpayers. The risk of retirement insecurity and the growing student debt burden can exacerbate the economic problems of saving and paying for retirement. A typical recent college graduate, can have an average of $30,000 in student loans, and may forego existing 401(k) savings and matching benefit options available from their employer in order to pay down their student loan debt.

Others have attempted to address the student loan crisis by trying to facilitate the repayment of student loans. These approaches optimize debt payments toward higher interest rate loans, and in some cases offer a new employee benefit of administering automatic payroll deductions. For example, some employers have adopted a student loan payment administration and/or a limited "matching" contribution toward student loan repayment as a fringe benefit for employees. It is notable that, at this time, such contributions do not receive special tax treatment as retirement contributions do, although there are several legislative proposals being considered to revise this tax treatment.

Another approach is to provide a 401(k) contribution feature based upon an employee's student loan payment. In practice, a company's employee makes a student loan payment, which would trigger the company to make a pre-tax contribution into the employee's 401(k) or other retirement account.

There is a continued need in the art for solutions to the problems caused by ever-growing student loan debt. For example, there is a need for systems and techniques for helping one with a debt that includes periodic loan payments (such as a student loan) to nonetheless contribute to a savings or retirement account.

It will be appreciated that this background description has been created by the inventor to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

This disclosure is directed to systems, methods, and computer program products for automatically managing periodic debt payments and savings contributions. The computer-implemented architecture provided can include a non-transitory computer-readable medium including a payment management program constructed to determine an allocation structure for each periodic payment between a debt obligation and a savings fund.

In one embodiment, a system for automatically managing periodic debt payments and savings contributions includes a non-transitory computer-readable medium including a payment management program, a benefit management processor in operable arrangement with the computer-readable medium, and a data storage device in operable arrangement with the benefit management processor. The benefit management processor is configured to execute the payment management program contained on the computer-readable medium.

The data storage device includes payment data relating to a group of lendees. The payment data includes, for each of the group of lendees, a payment election, loan obligation data including a debt obligation value and a lender, and savings account data.

The payment management program includes a payment allocation module and a fund disbursement module. The payment allocation module includes a computer executable allocation code segment configured to apportion the payment election into a debt portion and a savings portion. The fund disbursement module includes a computer executable disbursement code segment configured to electronically disburse the debt portion of the payment election to the lender in a periodic manner according to a loan repayment schedule and to electronically disburse the savings portion to the savings account of the lendee in a periodic manner according to a savings contribution schedule.

In another aspect, an embodiment of a method of automatically managing periodic debt payments and savings contributions includes employing a processor to execute a payment management program including computer-executable instructions stored on a non-transitory computer-readable medium. The payment management program performing a number of steps.

An indication of a value for a payment election is received from a borrower. The borrower has a loan obligation to a lender and a savings account. The payment election is apportioned into a debt portion and a savings portion. The debt portion of the payment election is periodically disbursed to the lender to repay the loan obligation according to a loan repayment schedule. The savings portion of the payment election is periodically disbursed into the savings account of the borrower according to a savings contribution schedule.

In still another aspect, an embodiment of a non-transitory, tangible computer-readable storage medium bears computer executable instructions for automatically managing periodic debt payments and savings contributions. The instructions, when executing on one or more computing devices, perform a number of steps.

An indication of a value for a payment election is received from a borrower. The borrower has a loan obligation to a lender and a savings account. The payment election is apportioned into a debt portion and a savings portion. The debt portion of the payment election is periodically disbursed to the lender to repay the loan obligation according to a loan repayment schedule. The savings portion of the payment election is periodically disbursed into the savings account of the borrower according to a savings contribution schedule.

As will be appreciated, the systems, methods, and computer program products disclosed herein are capable of being carried out in other and different embodiments and capable of being modified in various respects. Accordingly, it is to be understood that both the foregoing general description and the following detailed description are exemplary and explanatory only and do not restrict the scope of the appended claims.

DETAILED DESCRIPTION

Systems, methods, and computer program products for automatically managing periodic debt payments and savings contributions are described herein. Further and alternative aspects and features of the disclosed principles will be appreciated from the following detailed description and the accompanying drawings. As will be appreciated, the principles relating to systems, methods, and computer program products for automatically managing periodic debt payments and savings contributions disclosed herein are capable of being carried out in other and different embodiments, and capable of being modified in various respects. Accordingly, it is to be understood that the following detailed description is exemplary and explanatory only.

In embodiments of systems and methods for automatically managing periodic debt payments and savings contributions following principles of the present disclosure, two seemingly un-related employee benefits are tied together by leveraging a discovery in behavioral finance and economics to facilitate both the payment of a borrower's loan (e.g., a student loan) and contributions to a savings account (e.g., a retirement savings account, such as an individual retirement account or a 401(k) contributions account). In embodiments, the ability to tie loan payments together with retirement savings is a value add feature for a benefits administrator that can be provided using a system/method for automatically managing periodic debt payments and savings contributions following principles of the present disclosure.

Using a method for automatically managing periodic debt payments and savings contributions following principles of the present disclosure, the burden of administrative steps encountered to sign up for making contributions to a savings account, and the attendant "pain of saving," can be avoided by creating an automatic path of allocating some or all of a payment election that had been being used to repay a loan obligation to a designated savings account of the borrower. Without being bound by any particular theory or causal nexus, the "pain of saving" can be attributed to a person's strong "present bias," which is a concept of behavioral economics that refers to the tendency of a person to give stronger weight to payoffs that are closer to the present time when considering trade-offs between two future moments. The pain is inflicted when a person actively reduces present income and consumption habits in favor of the delayed gratification of saving for future consumption. Accordingly, the automatic nature of embodiments of systems and methods for automatically managing periodic debt payments and savings contributions following principles of the present disclosure allow the borrower to avoid this pain of saving. In addition, the automatic nature of embodiments of systems and methods for automatically managing periodic debt payments and savings contributions following principles of the present disclosure and the reduction in administrative steps helps overcome the "inertia" (in behavioral economics, the endurance of a stable state associated with inaction and the concept of status quo bias) that exists in the borrower's decision making and behavior.

In embodiments, a system for automatically managing periodic debt payments and savings contributions constructed according to principles of the present disclosure can include special administrative systems to make payment to certain debt collection services and deposits into a savings account according to an allocation protocol following principles of the present disclosure. In embodiments, a method for automatically managing periodic debt payments and savings contributions following principles of the present disclosure can help a borrower obtain a more secure retirement by significantly increasing the funds the borrower contributes to a savings account over the borrower's employment history.

In embodiments, borrowers who sign up for loan payments (such as those related to a student loan) to be automatically withdrawn from their payroll, optionally with a matching payment from an employer, eventually have payments automatically allocated to a savings account, such as a 401(k) or 403(b) retirement account, for example, over time as the debt is repaid. As the loan is paid, the participant would continue to have the same dollar amount withdrawn from his or her account, but the excess amount over what is owed on a periodic basis to repay the debt obligation is automatically disbursed to a designated savings account. In embodiments, the savings account can comprise any suitable savings account, such as a traditional savings account, an individual retirement account, or a 401(k) contributions account.

The method takes advantage of a discovery in behavioral economics to help overcome the problem of initiating contributions to a savings program by automatically allocating money already being deducted from a borrower's paycheck to a designated savings account of the borrower, thereby avoiding the "pain of savings" by using money that had already been previously deducted from the borrower's paycheck to repay the loan to now also fund the savings account. This helps to solve a very real problem because many people, particularly millennials, are not saving for retirement.

In embodiments, a method of automatically managing periodic debt payments and savings contributions following principles of the present disclosure can include an allocation protocol that apportions a payment election between a debt portion and a savings portion to either pay down principal or invest for retirement. In embodiments, the allocation protocol that apportions a payment election between a debt portion and a savings portion can be configured to adjust the ratio between the portions depending upon one or more suitable variables, such as, interest rates, market factors, and certain tax impacts, for example.

In another instance, a method of automatically managing periodic debt payments and savings contributions following principles of the present disclosure can be used to automatically allocate the payment election across a portfolio of loans held by the borrower and the designated savings account. In embodiments, the allocation module of a payment management program constructed according to principles of the present disclosure is configured to allocate the portion of the payment election in excess of any required minimum loan payments to the highest interest loan(s) or the savings account based on one or more metrics, such as, the expected return of the funds in the savings account in the form of a retirement account, for example. Accordingly, if the interest rates of the loans are high, for example, the automatic allocation can weigh in favor of the debt portion of the payment election being applied to such loans. When the interest rates (which may be variable) of the outstanding loans is low, dollars in excess of the minimum loan payment(s) can be allocated to the savings account.

In embodiments, a system for automatically managing periodic debt payments and savings contributions constructed according to principles of the present disclosure includes a non-transitory computer-readable medium including a payment management program and a processor adapted to execute the payment management program. The payment management program is configured to perform a payment allocation protocol following principles of the present disclosure.

Figure 1:
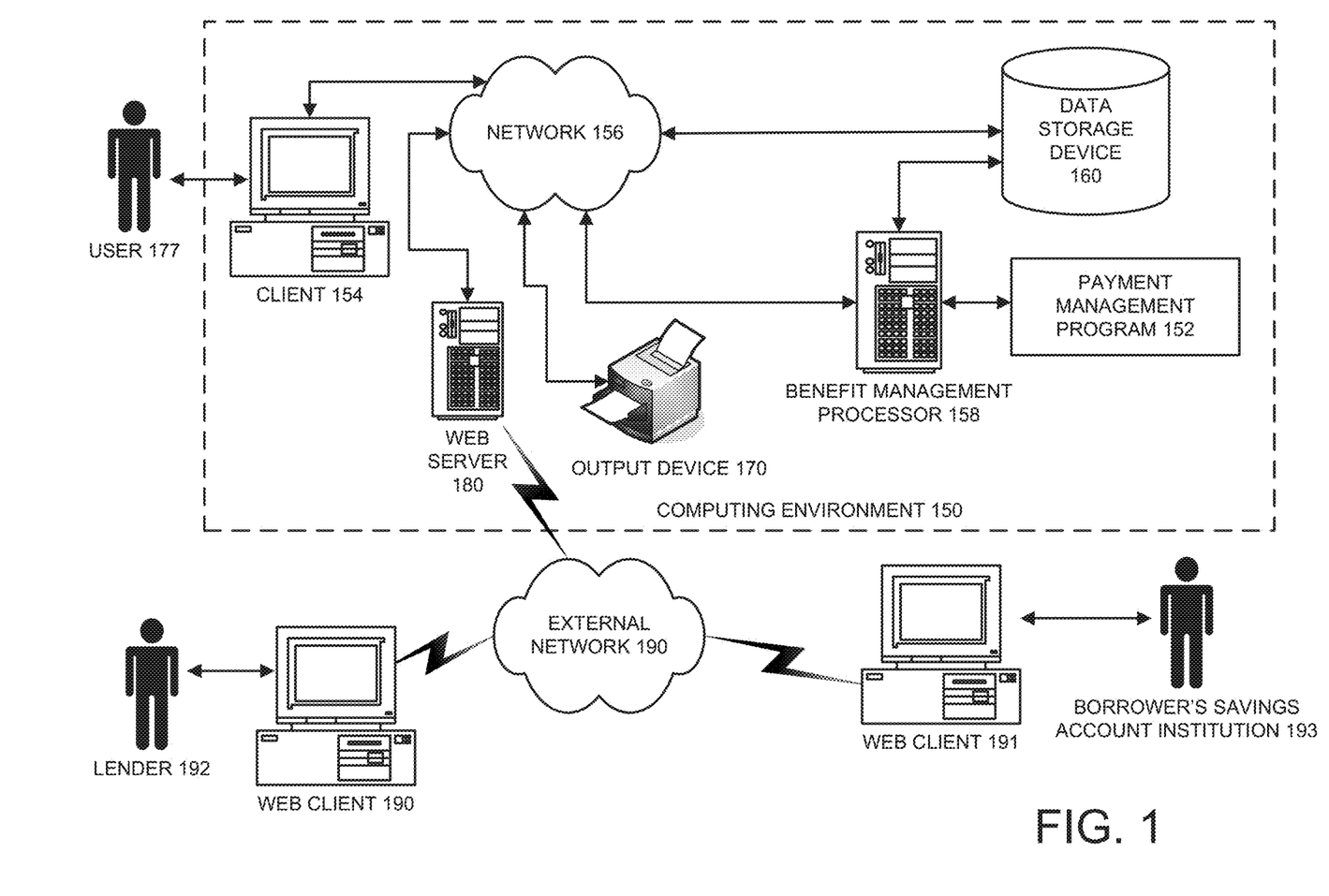
FIG. 1 is a schematic diagram of an embodiment of a computer-implemented system for automatically managing periodic debt payments and savings contributions constructed according to principles of the present disclosure.

Turning now to the Figures, there is shown in FIG. 1 an exemplary general overview of a system for automatically managing periodic debt payments and savings contributions constructed according to principles of the present disclosure. Referring to FIG. 1, an embodiment of a computing environment 150 is shown that includes a payment management program 152 for automatically managing periodic debt payments and savings contributions. In the illustrated embodiment, a benefits administrator can be in communication with a borrower, at least one lender, and at least one financial institution operating a suitable savings account.

The payment management program 152 can be stored on a non-transitory, tangible computer-readable medium. The computing environment 150 constitutes a computer-implemented system for automatically managing periodic debt payments and savings contributions. The computing environment 150 can include a number of computer systems, which generally can include any type of computer system based on: a microprocessor, a mainframe computer, a digital signal processor, a portable computing device, a personal organizer, a device controller, or a computational engine within an appliance. In some embodiments, the computer environment 150 is implemented in one or more electronic devices that are located in one or more locations.

The illustrated computing environment 150 can include a client 154, an internal network 156, at least one benefit management processor 158 operating the payment management program 152, a data storage device 160, an output device 170, and a web server 180 operatively connected to an external network 190. The client 154, the benefit management processor 158, the data storage device 160, the output device 170, and the web server 180 are operatively connected together via the internal network 156. The benefit management processor 158 can be specially programmed with the payment management program 152 to allocate a borrower's payment election such that it is apportioned between a debt portion and a savings portion based upon an allocation protocol which follows principles of the present disclosure.

A plurality of web clients 190, 191 can use the computing environment 150 to interface with the computing environment 150. For example, a lender 192 can use the web client 190 to receive information from, and to transmit information to, the computing environment 150 about each participating borrower's underlying loan that is the subject of the payment allocation. A borrower's savings account institution 193 can use the web client 191 to transmit savings account data from the web client 191 for use by the payment management program 152. The benefit administrator can be communicatively connected with one or more partner sites (such as the two shown—the lender 192 and the borrower's savings account institution 193) and borrowers that participate in the payment management program via the external network 190. In some embodiments, a borrower can use another web client to communicate with the payment management program 152 over the external network 190. In other embodiments, a different communication channel can be established between the lender, the borrower's savings account institution, the borrower, etc. and the payment management program 152 to transmit data feeds to the payment management program 152. In still other embodiments, the benefit administrator provider can use another communication channel, such as a telephone network, for example, to communicate with the lender, the borrower, and/or the borrower's savings account institution.

The client 154 can be used to communicate with an authorized user 177 to enter payment data into the data storage device 160, to communicate with the web clients 190, 191, and/or to execute the payment management program 152. The client 154 can comprise at least one input device. The client 154 can generally include any node on a network including computational capability and including a mechanism for communicating across the network 156.

In one embodiment, the client 154 hosts an application front end of the payment management program 152. The application front end can generally include any component of the payment management program 152 that can receive input from the user 177 or the client 154, communicate the input to the payment management program 152, receive output from the payment management program 152, and present the output to the user 177 and/or the client 154. In one embodiment, the application front end can be a stand-alone system.

The network 156 can generally include any type of wired or wireless communication channel capable of coupling together computing nodes. Examples of a suitable network 156 include, but are not limited to, a local area network, a wide area network, or a combination of networks.

The benefit management processor 158 is in operable arrangement with the non-transitory, computer readable medium to operate the payment management program 152. The benefit management processor 158 is configured to execute the payment management program 152 contained on the computer-readable medium. The benefit management processor 158 can generally include any computational node including a mechanism for servicing requests from a client for computational resources, data storage resources, or a combination of computational and data storage resources. Furthermore, the benefit management processor 158 can generally include any system that can host the payment management program 152. The benefit management processor 158 can generally include any component of an application that can receive input from the web clients 190, 191 via the web server 180 and from the client 154 through the network 156, process the input, and present the output to the payment management program 152, the client 154, the web server 180, and/or the data storage device 160. The benefit management processor 158 can generally include any component of an application that can process data, interact with the data storage device 160, and execute logic for the payment management program 152.

The payment management program 152 comprises a computer program product residing on a non-transitory, tangible computer readable medium having a plurality of instructions stored thereon which, when executed by the benefit management processor 158, cause the processor 158 to perform steps associated with automatically managing periodic debt payments and savings contributions as described herein. The payment management program 152 can be any suitable computer-implemented application for processing information exchanged with the client 154 and/or the web clients 190, 191 via a web platform such as those known to one of ordinary skill in the art. The payment management program 152 can contain computer executable instructions adapted to exchange information in the form of data with the data storage device 160. The payment management program 152 can include a graphical user interface which can facilitate the input of borrower, lender, income source (e.g., salary), payment election, and other benefit information into the payment management program 152.

In embodiments, the payment management program 152 includes a payment allocation module and a fund disbursement module. The payment allocation module includes a computer executable allocation code segment configured to apportion the payment election into a debt portion and a savings portion. The fund disbursement module includes a computer executable disbursement code segment configured to electronically disburse the debt portion of the payment election to the lender in a periodic manner according to a loan repayment schedule and to electronically disburse the savings portion to the savings account of the lendee in a periodic manner according to a savings contribution schedule.

In embodiments, the payment management program 152 includes a loan information module adapted to collect loan information from the first partner site 190 through a plurality of data fields. In embodiments, the payment management program 152 can display a graphical user interface to one or more lenders 192 via the web-enabled interface provided by the web server 180. The graphical user interface can include the loan information data fields. In other embodiments, the payment management program 152 can include a graphical user interface that is presented to the client 154 to input the loan information into the loan information module.

In embodiments, the payment allocation module of the payment management program is configured to set the savings portion of the payment election equal to zero during a loan repayment phase in which the loan obligation is greater than zero such that the savings contribution schedule occurs after the loan repayment schedule is completed. In embodiments, the payment allocation module of the payment management program is configured, during a loan satisfaction phase in which the loan repayment schedule is completed and the loan obligation is satisfied, to set the debt portion of the payment election equal to zero and to set the savings portion of the payment election equal to the payment election.

In embodiments, the payment allocation module of the payment management program is configured to re-apportion periodically the payment election into a revised debt portion and a revised savings portion. Re-apportionment can be triggered by a variety of events as will be appreciated by one skilled in the art. For example, in embodiments, the payment management program is configured to periodically re-apportion the payment election based upon at least one of a loan interest rate, a savings rate, an investment factor, and a tax assessment.

In embodiments, the investment factor can be based upon an expected future return of an investment. In embodiments, the investment factor can be based upon an average of the historical return of an investment (e.g., a mutual fund) over a selected time period. In embodiments, the investment factor can be based upon a guaranteed rate of return of an investment (e.g., an annuity product). In embodiments, the payment allocation module of the payment management program is configured to re-apportion periodically the payment election into a revised debt portion and a revised savings portion based upon any suitable factor, such as, without limitation, the elapse of time or an increase in the income source (e.g., a raise in salary), for example.

In embodiments, the payment allocation module of the payment management program is configured to account for the tax consequences associated with setting the debt portion and the savings portion of the payment election and with periodically re-apportioning the payment election. For example, in embodiments where the savings account of the borrower comprises a 401(k) account that can be funded using pre-tax money, the payment allocation module of the payment management program, when re-apportioning the payment election such that the saving portion increases, can be configured to increase the savings portion of the payment election by an appropriate tax rate based upon the ability to contribute to the 401(k) savings account on a pre-tax basis such that the borrower's take home pay remains about the same after the re-apportionment.

In embodiments, the savings contribution schedule can at least partially overlap with the loan repayment phase. For example, in embodiments, the payment allocation module of the payment management program is configured to set at least one of the savings portion and the revised savings portion of the payment election equal to a value greater than zero during a loan repayment phase in which the loan obligation is greater than zero such that the savings contribution schedule occurs at least partially during the loan repayment schedule.

In embodiments, the payment allocation module of the payment management program is configured to disburse periodically a debt repayment match amount to the lender according to the loan repayment schedule. The debt repayment match can be calculated based upon the debt portion of the payment election. The debt repayment match is not deducted from the income source (e.g., salary) of the borrower.

In embodiments, the payment allocation module of the payment management program is configured to increase periodically the payment election automatically without further input from the borrower according to an automatic escalation condition being satisfied. As one skilled in the art will appreciate, any suitable automatic escalation condition can be used (e.g., the passage of a predetermined amount of time or an increase in the borrower's income source (e.g., salary)).

The architecture solution of the payment management program 152 is flexible and scalable to include additional information for different loan obligations held by the borrower and to include additional loan information requirements for the various loans held by the borrower. In embodiments, the payment management program 152 includes other modules and computer-executable instructions adapted to carry out other steps and features of a method of automatically managing periodic debt payments and savings contributions following principles of the present disclosure. Any suitable computer-readable storage medium can be utilized for the payment management program 152, including, for example, hard drives, floppy disks, CD-ROM drives, tape drives, zip drives, flash drives, optical storage devices, magnetic storage devices, and the like. The client 154 can be used by an authorized user 177 to help administer the payment management program 152.

The data storage device 160 is in operable arrangement with the benefit management processor 158. The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory. In embodiments, the data storage device 160 is operably arranged with the benefit management processor 158 and is adapted to store payment data for each borrower for which the payment management system is being used.

In one embodiment, the database 160 contains payment data relating to a group of lendees. The payment data can include, for each of the group of lendees, an income source value, a payment election, loan obligation data including a debt obligation value and a lender, and savings account data. This information can be used by the payment management program 152 to perform a method of automatically managing periodic debt payments and savings contributions according to principles of the present disclosure. In embodiments, the data storage device 160 can store a data warehouse that comprises a collection of databases (e.g., Access, SQL). For example, the data storage device 160 can contain a permission database which stores user credentials and permissions specific to active users 177, lenders 192, savings account institutions 193, and borrowers that interact with the computing environment 150.

The output device 170 can comprise a printer, a display monitor, and a connection to another device, for example. The output device 170 can be used to generate reports for sending to the lender 192 and/or each borrower which contain information generated by the payment management program 152 about the periodic payment of the debt portion apportionments of each payment election made by the payment management program 152. The output device 170 can be used to generate reports for sending to the savings account institution 193 and/or each borrower which contain information generated by the payment management program 152 about the periodic payment of the savings portion apportionments of each payment election made by the payment management program 152. The output device 170 can be used to communicate to the user 177 information generated by the payment management program 152 about the disbursements made by the system 150.

A report engine can be provided to generate displays of information stored in the data storage device 160 concerning the disbursements made by the system 150, which can be viewed using the output device 170, for example. In one embodiment, the report engine further provides pre-configured and/or ad hoc reports relating to the payment status of the payment elections made by each borrower participating in the benefit program.

The web server 180 can provide a suitable web site or other Internet-based graphical user interface which is accessible by the lender 192, providing borrower information data feeds, such as borrower loan and payment history information, for example, and the borrower's savings account institution 193, providing savings account information, for example. The web server 180 can serve as a web-enabled interface adapted to exchange information with multiple partner sites 190, 191, including to receive loan information from a first partner site 191, to send payment information generated by the payment management program 152 to the first partner site 190, and to receive borrower savings account information from a second partner site 191. In other embodiments, other partner sites can be connected to the web-enabled interface, such as other lenders, other partner sites providing borrower savings account information, and other partner sites providing borrower information including at least one of the borrowers' income source (e.g., salary) and payment election information therefrom.

The web server 180 can provide access to an internet-based web platform that includes the payment management program 152. In some embodiments, the web server 180 can be adapted to host a web site, to execute enterprise applications, to deliver web pages and other content upon request to web clients, and to receive content from web clients. The web clients 190, 191 can be connected to the web server 180 through the network connection 190 (e.g., Internet, Intranet, LAN, WAN and the like). The web server 180 can use an authentication server in order to validate and assign proper permissions to authorized users of the system. A permission database can store web user credentials and permissions specific to each user, investor, agent, broker, market information source, etc. The web server 180 can be outfitted with a firewall such that requests originating from outside the computing environment 150 pass through the firewall before being received and processed at the web server 180.

In addition to the components discussed above, the computing environment 150 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

In yet other embodiments, the computing environment can include an electronic common repository for electronic documents relating to payment information. The electronic common repository can be used by users 177, lenders 192, borrowers' savings account institutions 193, and others according to a set of authorized permissions to the respective party to upload electronic documents generated at different times of the process from the initial payment election, through the loan repayment phase, and further through ongoing savings in the loan satisfaction phase after the loan obligation has been satisfied.

In other embodiments, systems and methods of automatically managing periodic debt payments and savings contributions can be implemented on various types of computer architectures, such as for example on a single general purpose computer or workstation, on a networked system, in a client-server configuration, or in an application service provider configuration. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, flash memory, flat files, databases, programming data structures, programming variables, IF-THEN (or similar type) statement constructs, etc.). It is noted that data structures describe formats for use in organizing and storing data in databases, programs, memory, or other tangible computer-readable media for use by a computer program.

The computer components, software modules, functions, data stores and data structures described herein may be connected directly or indirectly to each other in order to allow the flow of data needed for their operations. It is also noted that a module or processor can include but is not limited to a unit of code that performs a software operation, and can be implemented, for example, as a subroutine unit of code, a software function unit of code, an object (as in an object-oriented paradigm) or an applet and can be implemented in a computer script language or another type of computer code. The software components and/or functionality (e.g., the allocation functionality associated with the payment election) can be located on a single computer or distributed across multiple computers depending upon the particular circumstances surrounding its use (e.g., located on client and/or server computers).

In various embodiments, methods of automatically managing periodic debt payments and savings contributions in accordance with principles of the present disclosure operate as software programming operating on a computer processor. Dedicated hardware implementations, including, but not limited to, application-specific integrated circuits, programmable logic arrays and other hardware devices, can likewise be constructed to implement the methods described herein. Furthermore, alternative software implementations, including, but not limited to, distributed processing or component/ object distributed processing, parallel processing, or virtual machine processing, can also be constructed to implement the methods described herein.

In various embodiments, a payment management program in accordance with principles of the present disclosure can take the form of a computer program product on a non-transitory, tangible computer-readable storage medium having computer-readable program code means embodied in the storage medium. Software implementations of the techniques for automatically managing periodic debt payments and savings contributions as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a non-transitory, tangible storage medium includes a distribution medium and art-recognized equivalents and successor media, in which the software implementations herein are stored.

Additionally, embodiments of a payment management program 152 stored upon a non-transitory, computer-readable medium following principles of the present disclosure contain a plurality of instructions which, when executed by the benefit management processor 158, cause the processor 158 to perform steps associated with automatically managing periodic debt payments and savings contributions following principles of the present disclosure. In embodiments, the payment management program 152 stored upon a non-transitory, computer-readable medium can be configured to carry out any embodiment of a method for automatically managing periodic debt payments and savings contributions following principles of the present disclosure. In embodiment, the benefit management processor 158 is adapted to execute the programming stored upon the non-transitory computer readable medium to perform various methods, processes, and modes of operations in a manner following principles of the present disclosure.

In embodiments of a method of automatically managing periodic debt payments and savings contributions following principles of the present disclosure, a system according to principles of the present disclosure can be used to automatically apportioning the payment election into a debt portion and a savings portion and periodically deduct the payment election from the borrower's income source (e.g., salary) and disburse the payment election to a lender to repay the borrower's loan obligation and/or a savings institution to deposit the payment into the borrower's savings account. In embodiments, a method of automatically managing periodic debt payments and savings contributions following principles of the present disclosure includes employing a processor to execute computer executable instructions stored on a tangible computer-readable medium to perform a step of periodically apportioning a recurring payment between a debt payment to apply to a loan obligation and a savings contribution amount to apply to a savings account.

Figure 2:
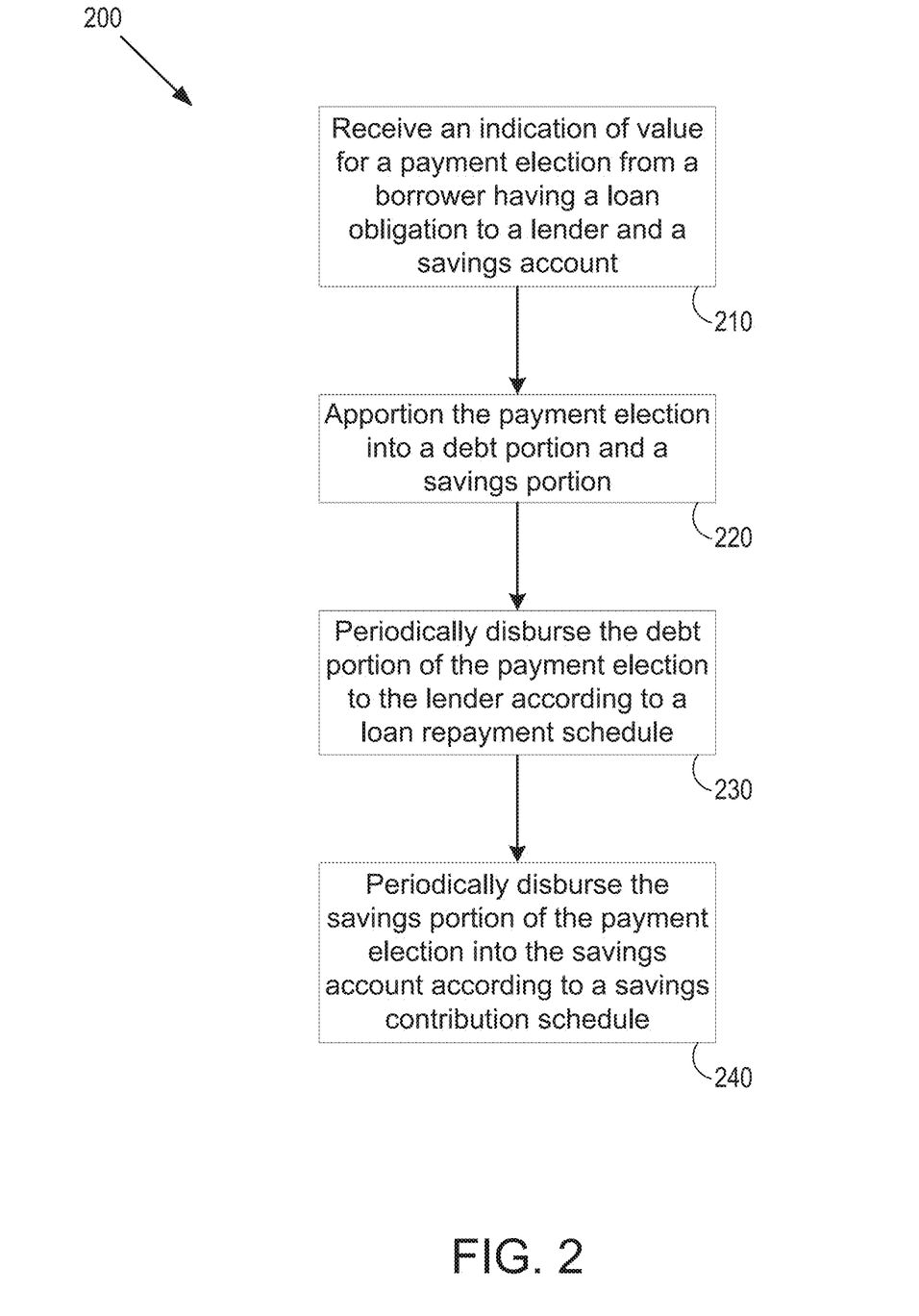
FIG. 2 is a flow diagram illustrating an exemplary embodiment of a method for automatically managing periodic debt payments and savings contributions following principles of the present disclosure.

Referring to FIG. 2, steps of an embodiment of a method 200 of automatically managing periodic debt payments and savings contributions following principles of the present disclosure are shown. In embodiments, a system for automatically managing periodic debt payments and savings contributions constructed according to principles discussed herein can be used to perform embodiments of a method of automatically managing periodic debt payments and savings contributions following principles of the present disclosure.

Referring to FIG. 2, in the illustrated method 200 of automatically managing periodic debt payments and savings contributions, a processor can be employed to execute a payment management program including computer-executable instructions stored on a non-transitory computer-readable medium. The payment management program can perform various allocation steps.

An indication of a value for a payment election can be received from a borrower (step 210). The borrower has a loan obligation to a lender. The borrower also holds a savings account.

The payment election is apportioned into a debt portion and a savings portion (step 220). The debt portion of the payment election is periodically disbursed to the lender to repay the loan obligation according to a loan repayment schedule (step 230). The savings portion of the payment election is periodically disbursed into the savings account of the borrower according to a savings contribution schedule (step 240).

In embodiments, the payment election can be periodically deducted from an income source of the borrower according to an income disbursement schedule (e.g., semi-monthly). In embodiments, the income source can be any revenue source of the borrower. For example, in embodiments, the income source can be the borrower's salary. In other embodiments, the income source can be received by the borrower from an annuity product, an escrow account, a trust, or any other suitable source.

In embodiments, any suitable technique can be used to disburse the funds. For example, in embodiments, the funds comprising the payment election can be electronically transferred from the borrower's employer's account in a financial institution to the lender's account and/or to the buyer's savings account in another (or the same as the case may be) financial institution. In embodiments, a method of automatically managing periodic debt payments and savings contributions following principles of the present disclosure also includes disbursing the remainder of the borrower's income source (e.g., salary), after the payment election and any other appropriate deductions have been made, into the borrower's designated account. In embodiments, the payment management program facilitates the direct deposit of the apportioned payment election and the remainder of the borrower's income source by automated clearing house (ACH) as will be readily understood by one skilled in the art.

The loan repayment schedule occurs during a loan repayment phase in which the borrower's loan obligation to the lender is not fully satisfied (the principal owed to the lender under the loan obligation is greater than zero). In embodiments, the loan repayment schedule can be modified in response to changing conditions (e.g., the decrease or increase in principal of the loan obligation, changes in an interest rate applied to the principal of the loan obligation, an increase or decrease in the payment election). Accordingly, the loan repayment schedule can be tailored to satisfy the loan obligation in an economical manner.

Once the loan obligation is satisfied and the loan repayment schedule is completed, a loan satisfaction phase commences in which the borrower no longer has recurring debt repayment obligations under the loan. The loan satisfaction phase can continue for an ongoing amount of time after the loan has been repaid. In embodiments, the loan satisfaction phase can terminate when the borrower incurs a new debt obligation from the previous lender and/or another lending entity, at which point another loan repayment phase can commence, with a revised payment election apportionment calculated by the payment management program.

In embodiments, the payment management program can set the savings portion of the payment election equal to zero during the loan repayment phase such that the savings contribution schedule occurs after the loan repayment schedule is completed. In embodiments, during the loan satisfaction phase, the payment management program can set the debt portion of the payment election equal to zero and set the savings portion of the payment election equal to the payment election.

In embodiments, the payment management program periodically re-apportions the payment election into a revised debt portion and a revised savings portion. Re-apportionment can be triggered by a variety of events as will be appreciated by one skilled in the art. For example, in embodiments, the payment management program periodically re-apportions the payment election based upon at least one of a loan interest rate, a savings rate, an investment factor, and a tax assessment.

In embodiments, the savings contribution schedule can at least partially overlap with the loan repayment phase. For example, in embodiments, during a loan repayment phase in which the loan obligation is greater than zero, the payment management program can set at least one of the initial savings portion or a revised savings portion of the payment election equal to a value greater than zero such that the savings contribution schedule occurs at least partially during the loan repayment schedule.

In embodiments of a method of automatically managing periodic debt payments and savings contributions following principles of the present disclosure, the method can include an auto-escalation feature in which the payment election automatically increases in response to a certain condition occurring. For example, in embodiments, the payment management program periodically increases the payment election automatically without further input from the borrower according to an automatic escalation condition being satisfied. As one skilled in the art will appreciate, any suitable automatic escalation condition can be used.

For example, in embodiments, the automatic escalation condition comprises a raise in the borrower's salary. In such an arrangement, the payment election can be automatically increased as a function of the increase in the borrower's salary. For example, the percentage of increase of the borrower's salary can be automatically applied to the payment election (a five percent salary increase can automatically trigger a five percent increase in the payment election). In other embodiments, the automatic escalation condition can comprise the passage of time in the payment election program. For example, in embodiments, the payment election can automatically be increased by a predetermined amount or percentage on a periodic basis according to an automatic escalation schedule (e.g., on an annual basis).

In embodiments of a method of automatically managing periodic debt payments and savings contributions following principles of the present disclosure, the borrower's employer can offer a matching feature that is triggered in response to one or both of repaying the borrower's loan (e.g., a student loan) and contributing to the borrower's savings account (e.g., a 401(k) contribution account). Accordingly, in embodiments, the employer can offer a debt repayment match amount that is periodically added to the borrower's debt portion of the payment election and sent to the lender to repay the borrower's debt at an accelerated rate. In still other embodiments, the employer can offer a savings match that is periodically added to the borrower's savings portion of the payment election and deposited into the borrower's savings account.

In embodiments, the payment management program periodically disburses a debt repayment match amount to the lender according to a debt repayment matching schedule. The payment management program can be configured to calculate the debt repayment match based upon the debt portion of the payment election. The debt repayment match is not deducted from the income source (e.g., salary) of the borrower, but rather can be contributed by another (e.g., the borrower's employer).

In embodiments, the debt repayment match can be calculated using any suitable technique, such as, by being set equal to a percentage of the debt portion of the payment election. In embodiments, the debt repayment match can be calculated as being equal to the amount of the debt portion of the payment election, and in at least some embodiments is subject to a maximum cap value.

In embodiments, the debt repayment matching schedule can coincide with the loan repayment schedule. In other embodiments, the debt repayment matching schedule can differ from the loan repayment schedule. For example, the debt repayment matching schedule may not begin until a predetermined amount of time has elapsed (e.g., one year after the borrower begins participation in the payment election program).

In embodiments, the payment management program periodically disburses a savings contribution match amount into the borrower's savings account according to a savings matching schedule. The payment management program can be configured to calculate the savings contribution match amount based upon the savings portion of the payment election. The savings contribution match amount is not deducted from the income source (e.g., salary) of the borrower, but rather can be contributed by another (e.g., the borrower's employer).

In embodiments, the savings contribution match amount can be calculated using any suitable technique, such as, by being set equal to a percentage of the savings portion of the payment election. In embodiments, the savings contribution match amount can be calculated as being equal to the amount of the savings portion of the payment election, and in at least some embodiments is subject to a maximum cap value.

In embodiments, the savings matching schedule can coincide with the savings contribution schedule. In other embodiments, the savings matching schedule can differ from the savings contribution schedule. For example, the savings matching schedule may not begin until a predetermined amount of time has elapsed (e.g., one year after the borrower begins participation in the payment election program).

In embodiments, the savings matching schedule does not begin until the loan satisfaction phase has commenced. For example, in embodiments where the employer offers both a debt repayment match and a savings match, the employer may not offer both matching features simultaneously such that the savings matching schedule commences after the loan repayment schedule is completed and the loan obligation is satisfied.

EXAMPLES

The following examples further illustrate the invention but should not be construed as in any way limiting its scope.

Example 1

This example demonstrates the operation of an embodiment of a method for automatically managing periodic debt payments and savings contributions following principles of the present disclosure. In this Example, a Borrower graduates college with $30,000 of student loan debt (the national average). The Borrower starts a job with an employer and elects (or is automatically enrolled) in a payroll deduction program to assist with his student loan payments. The Borrower's payment election is $200 per month.

The Borrower sees a line item of $100 deducted every paycheck, which is paid to him according to a semi-monthly salary disbursement schedule. The payment management program sets the debt portion of the Borrower's payment election to $100 and the savings portion to zero. The payment management program periodically disburses the debt portion of the payment election to the lender according to the loan repayment schedule. In this Example, the lender is paid monthly in the amount of two debt portions (i.e., $200).

In the earlier years, the full amount of the payment election is applied to re-paying the Borrower's student loans. As the student loans are paid down, the Borrower's monthly student loan payment is reduced to $150. However, the Borrower continues to see $100 taken from his semi-monthly paychecks: $150 per month of which goes to the debt portion of the payment election in re-paying the student loan obligation and $50 per month of which goes to a savings portion of the payment election that is automatically disbursed into his retirement savings account. The savings portion of the Borrower's payment election is subject to a matching benefit offered by his employer, and that savings match amount is also electronically transferred into the Borrower's retirement savings account.

Example 2

This Example demonstrates the operation of an embodiment of a method for automatically managing periodic debt payments and savings contributions following principles of the present disclosure in which the Borrower first repays his loan obligation using the payment election, and then uses the payment election as a savings contribution. In this Example, the Borrower starts employment at the age of 21 and retires at the age of 62. The Borrower begins employment with a loan obligation in the amount of thirty thousand dollars. The loan repayment schedule is monthly payments for a thirty-year term at an annual interest rate of five percent. The monthly amount of the payment election is $160.

The savings contributions are directed to a retirement account in which the savings portions of the periodic payment elections are allocated to one or more investment vehicles, such as a mutual fund, including a target date fund. It is assumed that the money deposited into the retirement savings account grows at an annual interest rate of five percent.

Figure 3:
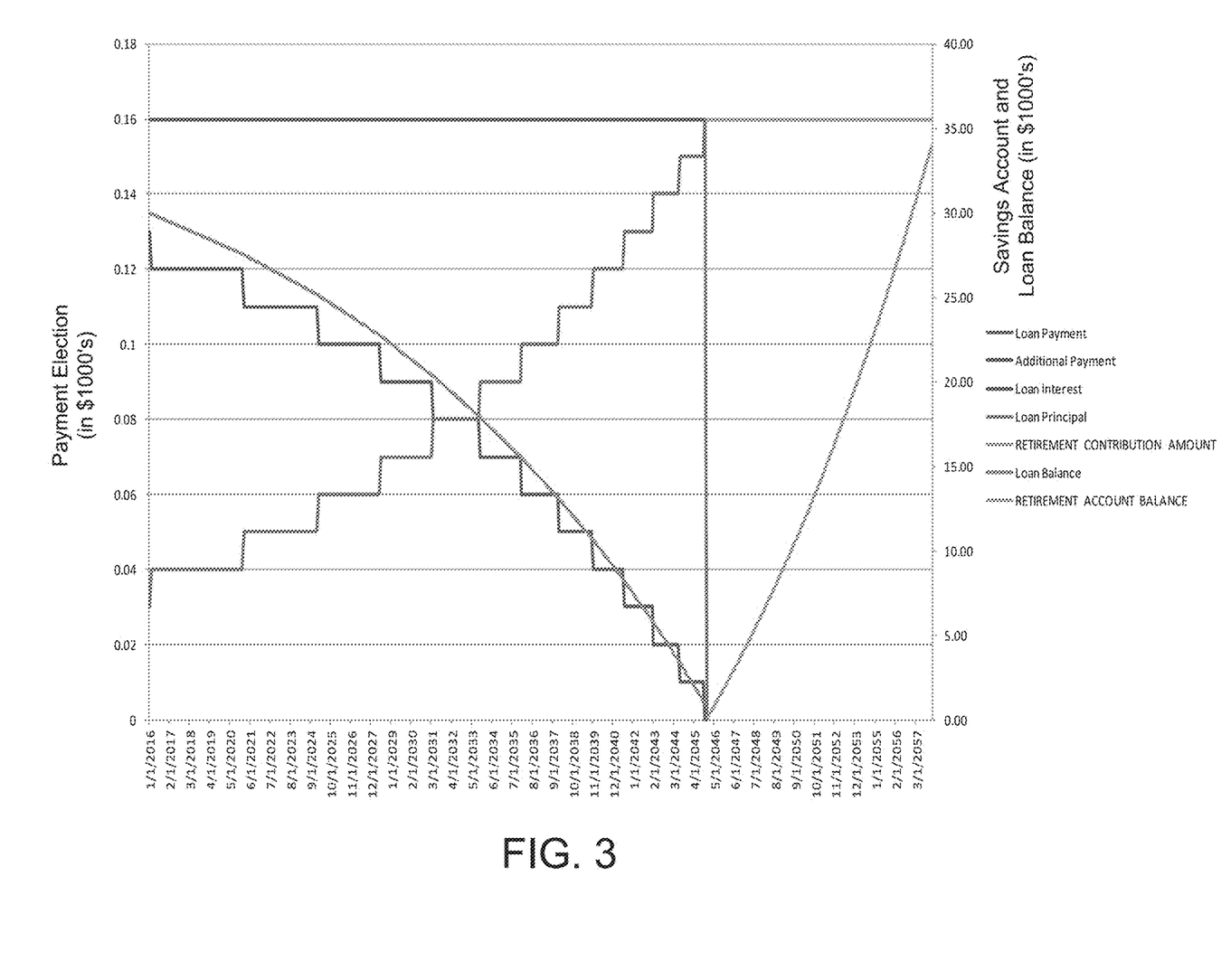
FIG. 3 is a plot of periodic loan payments and savings contributions versus time using an exemplary method for automatically managing periodic debt payments and savings contributions following principles of the present disclosure.

Referring to FIG. 3, it is seen that the Borrower satisfies the loan obligation after thirty years of payments in which the monthly debt portion of the payment election is equal to $160, and the monthly savings portion of the payment election is zero. At that time, the monthly payment election continues to be deducted from the Borrower's monthly paycheck(s), but the payment election is re-apportioned such that the monthly debt portion is zero and the monthly savings portion is $160. The Borrower retires at the age of 62 with almost $34,000 in his retirement savings account as a result of participating in the automatic allocation program using a method for automatically managing periodic debt payments and savings contributions following principles of the present disclosure.

Example 3

This Example demonstrates the operation of an embodiment of a method for automatically managing periodic debt payments and savings contributions that follows principles of the present disclosure in a manner similar to Example 2, but with an employer debt repayment matching feature. In this Example, the Borrower's employment and contribution details are the same as those in Example 2. In particular, the Borrower starts employment at the age of 21 and retires at the age of 62. The Borrower begins employment with a loan obligation in the amount of thirty thousand dollars. The loan repayment schedule is monthly payments at an annual interest rate of five percent. The monthly amount of the payment election is $160. The Borrower's employer offers a debt repayment match that is equal to the debt portion of the payment election.

The savings contributions are directed to a retirement account in which the savings portions of the periodic payment elections are allocated to one or more investment vehicles, such as a mutual fund, including a target date fund. It is assumed that the money deposited into the retirement savings account grows at an annual interest rate of five percent.

Figure 4:
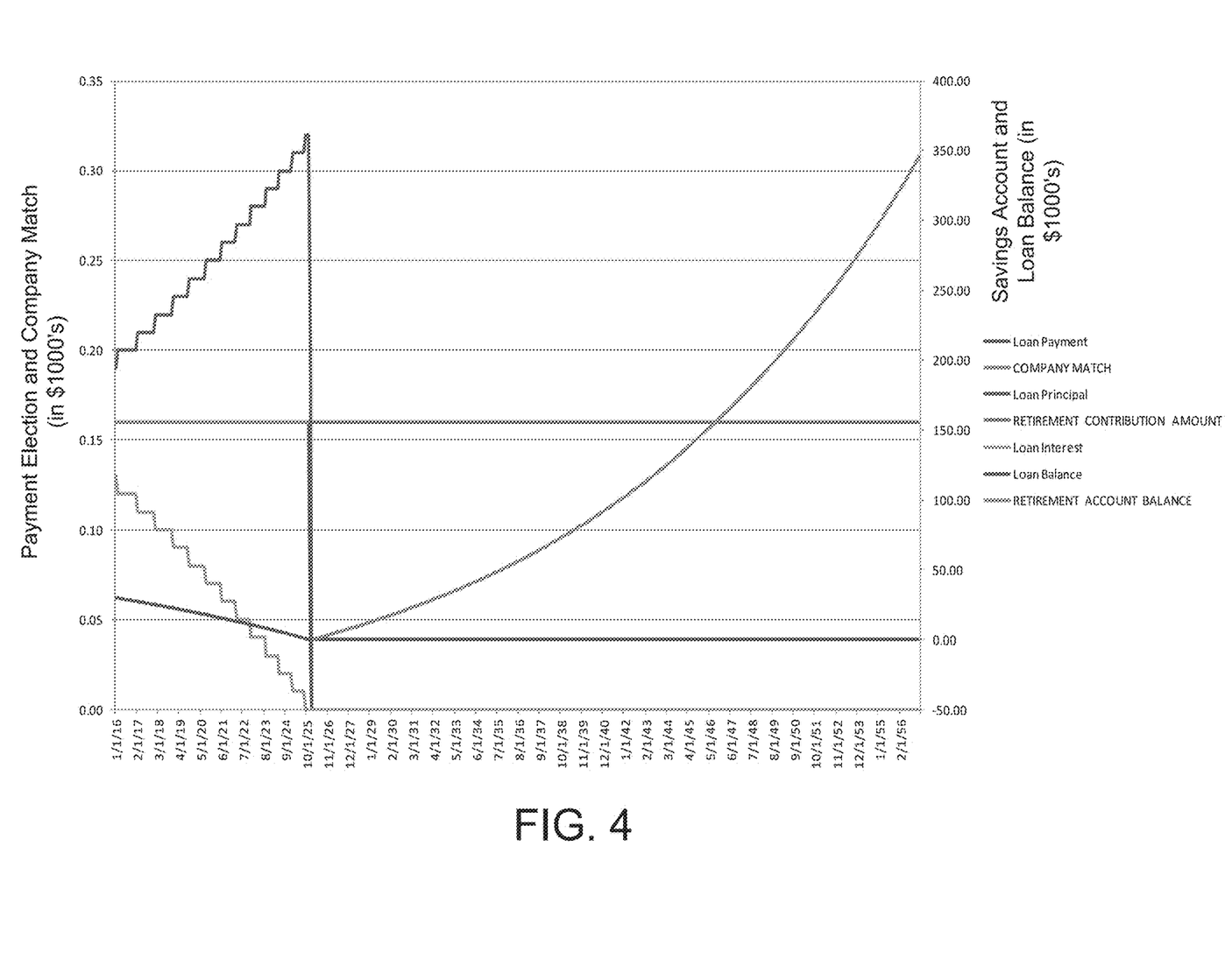
FIG. 4 is a plot of periodic loan payments and savings contributions versus time using an exemplary method for automatically managing periodic debt payments and savings contributions following principles of the present disclosure, illustrating a company loan payment matching feature.

Referring to FIG. 4, it is seen that the Borrower satisfies the loan obligation after ten years of payments in which the monthly debt portion of the payment election is equal to $160, and the monthly savings portion of the payment election is zero. In addition, during this time the Employer is contributing a debt repayment match amount that is equal to the monthly debt portion, namely an additional $160 a month, to repay the Borrower's loan obligation. Once the loan obligation is satisfied, the monthly payment election continues to be deducted from the Borrower's monthly paycheck(s), but the payment election is re-apportioned such that the monthly debt portion is zero and the monthly savings portion is $160. The Borrower retires at the age of 62 with over $346,000 in his retirement savings account as a result of participating in the automatic allocation program using a method following principles of the present disclosure which includes an Employer debt repayment match feature.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for automatically managing periodic debt payments and savings contributions, the system comprising:
a non-transitory computer-readable medium including a payment management program;
a benefit management processor in operable arrangement with the computer-readable medium, the benefit management processor configured to execute the payment management program contained on the computer-readable medium; and
a data storage device in operable arrangement with the benefit management processor, the data storage device including payment data relating to a group of lendees, the payment data including, for each of the group of lendees, a payment election, loan obligation data including a debt obligation value and a lender, and savings account data;
a web-enabled interface adapted to exchange information with a first partner site, including to receive loan obligation data therefrom, the web-enabled interface adapted to exchange information with a second partner site, including to receive payment data therefrom;
wherein the payment management program includes a payment allocation module, a fund disbursement module, and a loan information module, the payment allocation module including a computer executable allocation code segment configured to filter the payment election by apportioning the payment election into a debt portion and a savings portion, the fund disbursement module including a computer executable disbursement code segment configured to electronically disburse the debt portion of the payment election to the lender in a periodic manner according to a loan repayment schedule and to electronically disburse the savings portion to the savings account of the lendee in a periodic manner according to a savings contribution schedule, wherein the payment management program is configured to display a graphical user interface to each of the first partner site and the second partner site via the web-enabled interface, the graphical user interface being adapted to receive the loan obligation data from the first partner site and the savings account data from the second partner site, and wherein the loan information module is adapted to collect loan obligation data from the first partner site via the web-enabled interface through the graphical user interface containing a plurality of data fields and displaying at the first partner site.

2. The system according to claim 1, wherein the payment allocation module of the payment management program is configured to set the savings portion of the payment election equal to zero during a loan repayment phase in which the loan obligation is greater than zero such that the savings contribution schedule occurs after the loan repayment schedule is completed.

3. The system according to claim 1, wherein the payment allocation module of the payment management program is configured, during a loan satisfaction phase in which the loan repayment schedule is completed, to set the debt portion of the payment election equal to zero and to set the savings portion of the payment election equal to the payment election.

4. The system according to claim 1, wherein the payment allocation module of the payment management program is configured to disburse periodically a debt repayment match amount to the lender according to a debt repayment matching schedule, the debt repayment match calculated based upon the debt portion of the payment election, the debt repayment match not being deducted from an income source of the borrower.

5. The system according to claim 1, wherein the payment allocation module of the payment management program is configured to re-apportion periodically the payment election into a revised debt portion and a revised savings portion.

6. The system according to claim 5, wherein the payment allocation module of the payment management program is configured to re-apportion periodically the payment election based upon at least one of a loan interest rate, a savings rate, an investment factor, or a tax assessment.

7. The system according to claim 5, wherein the payment allocation module of the payment management program is configured to set at least one of the savings portion and the revised savings portion of the payment election equal to a value greater than zero during a loan repayment phase in which the loan obligation is greater than zero such that the savings contribution schedule occurs at least partially during the loan repayment schedule.

8. The system according to claim 1, wherein the payment allocation module of the payment management program is configured to increase periodically the payment election automatically without further input from the borrower according to an automatic escalation condition being satisfied.

* * * * *